(12) United States Patent
Tang et al.

(10) Patent No.: US 11,665,684 B2
(45) Date of Patent: May 30, 2023

(54) MECHANISM ON MEASUREMENT GAP BASED IN INTER-FREQUENCY MEASUREMENT

(71) Applicant: APPLE INC., Cupertino, CA (US)

(72) Inventors: Yang Tang, Santa Clara, CA (US); Jie Cui, Santa Clara, CA (US); Candy Yiu, Portland, OR (US); Rui Huang, Beijing (CN); Hua Li, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/411,717

(22) Filed: May 14, 2019

(65) Prior Publication Data

US 2019/0274146 A1 Sep. 5, 2019

Related U.S. Application Data

(60) Provisional application No. 62/671,340, filed on May 14, 2018, provisional application No. 62/689,692, filed on Jun. 25, 2018, provisional application No. 62/691,339, filed on Jun. 28, 2018.

(51) Int. Cl.
*H04W 72/12* (2009.01)
*H04W 24/10* (2009.01)
*H04L 5/00* (2006.01)
*H04W 24/08* (2009.01)

(52) U.S. Cl.
CPC ............ *H04W 72/12* (2013.01); *H04L 5/001* (2013.01); *H04W 24/08* (2013.01); *H04W 24/10* (2013.01)

(58) Field of Classification Search
CPC ..... H04W 72/12; H04W 24/10; H04W 24/08; H04L 5/001; H04L 36/0088; H04L 5/0091
See application file for complete search history.

(56) References Cited

U.S. PATENT DOCUMENTS

| | | | |
|---|---|---|---|
| 10,491,447 B2 | 11/2019 | Yeo et al. | |
| 10,986,589 B2 | 4/2021 | Dinan | |
| 2004/0042556 A1* | 3/2004 | Medvedev | H04L 1/0071 375/295 |
| 2011/0026636 A1* | 2/2011 | Ko | H04L 5/0053 375/295 |
| 2012/0307660 A1* | 12/2012 | Lindoff | H04W 24/08 370/252 |
| 2015/0215837 A1* | 7/2015 | Yiu | H04W 24/10 370/332 |
| 2017/0150384 A1 | 5/2017 | Rune et al. | |
| 2019/0306734 A1* | 10/2019 | Huang | H04L 5/0053 |
| 2020/0396704 A1* | 12/2020 | Dalsgaard | H04W 24/10 |

* cited by examiner

*Primary Examiner* — Yaotang Wang
(74) *Attorney, Agent, or Firm* — Fay Kaplun & Marcin, LLP

(57) ABSTRACT

An apparatus of a user equipment (UE) comprises one or more baseband processors to process a message received from a Fifth Generation (5G) NodeB (gNB) to perform one or more measurements in one or more target frequency layers, and for each of the one or more target frequency layers, to divide one or more other frequency layers into one of three categories comprising fully overlapped frequency layers, partially overlapped frequency layers, and non-overlapped frequency layers. The apparatus includes a memory to store the message.

20 Claims, 5 Drawing Sheets

MECHANISM ON MEASUREMENT GAP BASED IN INTER-FREQUENCY MEASUREMENT

CROSS-REFERENCE TO RELATED APPLICATIONS

The present application claims the benefit of U.S. Provisional Application No. 62/671,340 filed May 14, 2018, the benefit of U.S. Provisional Application No. 62/689,692 filed Jun. 25, 2018, and of U.S. Provisional Application No. 62/691,339 filed DATE. Said Application No. 62/671,340, said Application No. 62/689,692, and said Application No. 62/691,339 are incorporated herein by reference in their entireties.

BACKGROUND

In Fifth Generation (5G) New Radio (NR) systems, each individual frequency layer to be monitored can have very different synchronization signal block (SSB) SSB-based measurement timing configuration (SMTC) periodicity and offset. A mechanism of measurement is needed to accommodate all different measurement order and at the same time utilize all available measurement gap efficiently.

In 5G NR systems, different measurement objects can have different SMTC periods, which may or may not be the same as the measurement gap (MG) repetition period (MGRP). In this case, how to order the measurement to define and meet the minimum requirements become challenging.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
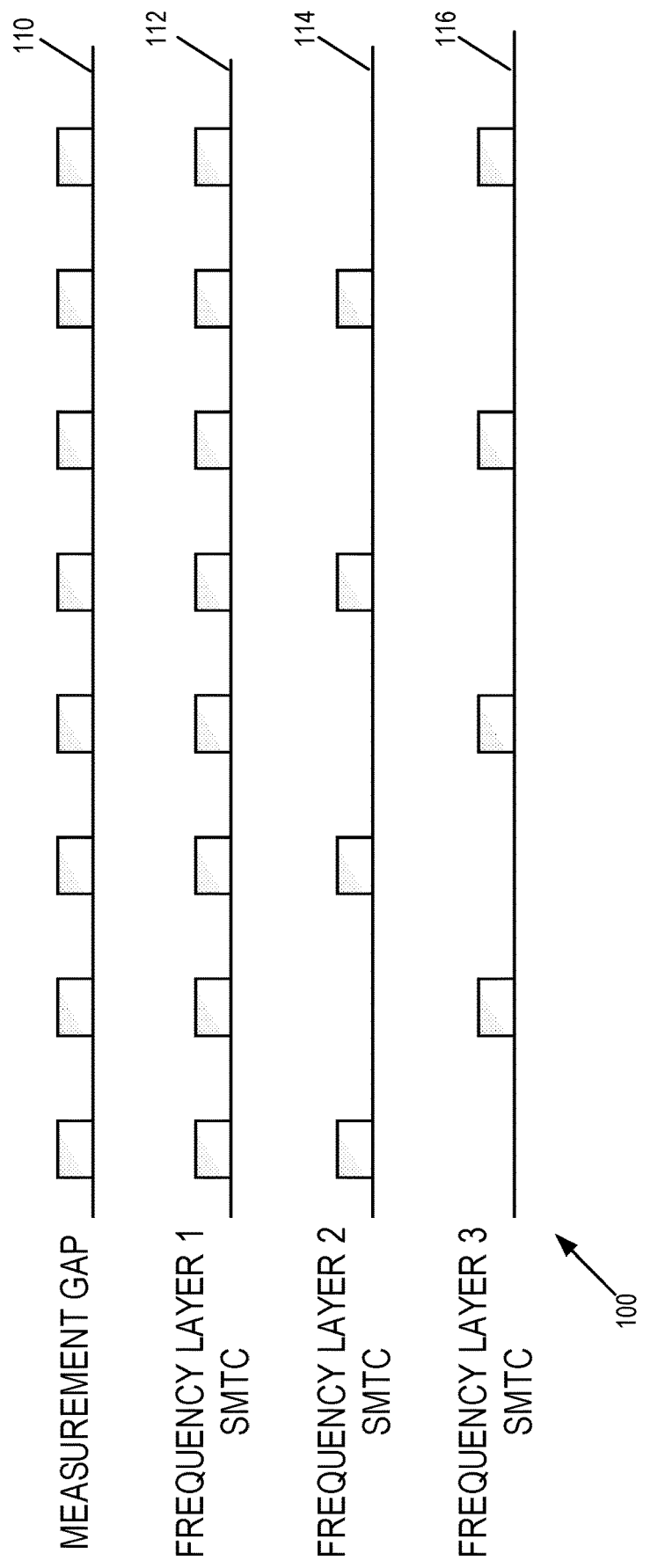
FIG. 1 is a diagram of an example of inter-frequency measurement in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an example of inter-frequency measurement in accordance with one or more embodiments will be discussed. In New Radio (NR) systems, as shown in timing diagram 100 wherein time is shown in the horizontal axis and each pulse represents a measurement gap occasion, each individual frequency layer to be monitored can have very different synchronization signal block (SSB) based measurement timing configuration (SMTC) periodicity and offset. The measurement gap timing is shown on graph 110, the SMTC for frequency layer 1 is shown on graph 112, the SMTC for frequency layer 2 is shown on graph 114, and the SMTC for frequency layer 3 is shown on graph 116. Measurement mechanisms are needed to accommodate all different measurement orders, and at the same time, to utilize all available measurement gap efficiently.

Previously, there have been quite a few proposals on how to define the gap based requirements. No conclusions, however, have been reached. In a first previous solution, the requirements are scaled by a unified value $N_{freq}$ $$T_i^{inter} = M \times \max(SMTC_i, MGRP) \times N_{freq}, i=1,2,\ldots N_{freq}.$$

In a second previous solution, the requirements are defined per carrier, such as:

$$T_i^{inter} = M \times \max(SMTC_i, MGRP) \times N_i^{scal}, i=1,2,\ldots N_{freq}.$$

In the second previous solution, the value of the scaling factor in each carrier $N_i^{scal} \leq N_{freq}^{fully} + N_{freq}^{partially} + 1 \leq N_{freq}$, where $N_{freq}^{fully}$ is the number of carriers whose SMTC occasions are fully colliding with the SMTC occasions of carrier #i, and where $N_{freq}^{partially}$ is the number of carriers whose SMTC occasions are partially colliding with the SMTC occasions of carrier #i.

In a third previous solution, the unified delay requirements shared by all carriers, e.g., $$T_i^{inter} = M \times \Sigma_{j=1}^{Nfreq} \max(SMTC_j, MGRP).$$

The previous solutions preclude certain measurement orders, and/or do not utilize the gap resources efficiently. Embodiments herein provide a unified solution to accommodate all measurement orders and meanwhile utilize the gap resource efficiently. A first design principle is that the user equipment (UE) implementation flexibility should be maintained. More specifically, the agreement requirements should not implicate the order of measurements. Depending on the order of measurements, the maximum delay for a specific frequency layer can be different.

In FIG. 1, using the layer 3 graph 116 as an example, when measurement order is frequency layer 1, 2 and 3, the maximum measurement delay for layer 3 is SMTC1*N+SMTC3*N, where N is the number of measurement samples per frequency layer, SMTC1 and SMTC3 denote the SMTC periodicity of layer 1 and 3. When measurement order is frequency layer 2, 1, and 3, the maximum measurement delay for layer 3 is SMTC2*N+SMTC3*N, where SMTC2 is SMTC periodicity of layer 2.

In a first embodiment, the eventual agreed measurement delay requirement should not preclude any measurement order. A second design principle is that the measurement gap should be utilized efficiently. Different frequency layers can be associated with different SMTC periods and offsets. Depending on configured MGRP, the measurement delay should be derived to maximize the gap utilization.

In the same example of FIG. 1, when measurement order is layer 2, 1, 3, the measurement delay for layer 1 can be SMTC2*N if unused gaps during layer 2 measurements are used for layer 1, or SMTC2*N+SMTC1*N if unused gaps during layer 2 measurements keep unused.

In a second embodiment, the eventual agreed measurement delay requirement should be based on the assumption that measurement gap occasions are efficiently used. On per-UE gap based requirements, for a specific frequency layer, e.g., the i-th layer, to be monitored, other frequency layers sharing the same measurement gaps can be classified into three categories. In a first category, fully overlapped layers, of which SMTC periods are no larger than Layer i's. In a second category, partially overlapped layers, of which SMTC periods are larger than Layer i's. In a third category, there are no overlapped layers. The measurement delay requirement of the target layer can be defined as:

$$T_{Indentify\_Inter\_perUEgap,i} = K_{Inter-freq,GS} * (T_{full\_overlap} + T_{partial\_overlap} + \max(SMTCi, MGRP) * M_{Identify_{Inter-freq}})$$

wherein $T_{full\_overlap}$ and $T_{partial\_overlap}$ denotes the delay due to fully overlapped layers and partially overlapped layers (the non-overlapped layers may have no measurement delay impact.); $M_{Identification\_Inter-freq}$ is the number of SMTC occasions which are used to identify a cell on layer i; and $K_{Inter-freq,GS} = (1/X)*100$ where X is a signaled RRC parameter for gap sharing scheme, and the corresponding gap sharing table is FFS.

Fully overlapped layers mean there is no unused gap which can be utilized by the target layer. The corresponding measurement delay due to fully overlapped layers can be defined as:

$$T_{full\_overlap} = \sum_{m=1}^{N_{full,FR1}} M_{Identify_{Inter-freq,FR1}} \max(SMTC_m, MGRP) + \sum_{n=1}^{N_{full,FR2}} M_{Identify_{Inter-freq,FR2}} \max(SMTC_n, MGRP)$$

wherein $N_{full, FR1}$ is the number of fully overlapped inter-frequency NR FR1 carriers being monitored; $N_{full, FR2}$ is the number of fully overlapped inter-frequency NR FR2 carriers being monitored; $M_{Identification\_Inter-freq}$, FR1 is the number of SSB which is used to identify a cell on a FR1 inter-frequency carrier, which is FFS; and $M_{Identification\_Inter-freq}$, FR2 is the number of SSB which is used to identify a cell on a FR2 inter-frequency carrier, which is FFS.

Partially overlapped layers mean there are unused gaps which can be utilized by the i-th layer. By defining SMTCi as the SMTC period of layer i, the SMTC periods of partially overlapped layers can be:

2*SMTCi, 4*SMTCi and 8*SMTCi, if SMTCi=20 ms
2*SMTCi and 4*SMTCi, if SMTCi=40 ms
2*SMTCi, if SMTCi=80 ms
No partial overlapped layers, if SMTCi=160 ms The corresponding measurement delay due to partially overlapped layers can be defined as:

$$T_{partial\_overlap} = \sum_{m=1}^{N_{partial,FR1}} L_m \times M_{Identify_{Inter-freq,FR1}} \times \max(SMTC_m, MGRP) + \sum_{n=1}^{N_{partial,FR2}} L_n \times M_{Identify_{Inter-freq,FR2}} \times \max(SMTC_n, MGRP)$$

wherein $N_{partial, FR1}$ is the number of fully overlapped inter-frequency NR FR1 carriers being monitored; $N_{partial, FR2}$ is the number of fully overlapped inter-frequency NR FR2 carriers being monitored; and $L_m$ and $L_n$ represents the SMTC periodicity ratio of the target layer and partially overlapped layer, for FR1 and FR2 respectively, e.g. if SMTC period of partially overlapped layer is 2*SMTCi, $L_m=1/2$.

Compared to $T_{full\_overlap}$ where no leftover gap can be used for the target layer, partially overlapped layers do leave some unused gaps which can be used for target layer measurement. Because of that, the corresponding delay due to overlapped layers is discounted by the partially overlapping rate $L_m$ and $L_n$.

To simplify the equation, $L_m$ and $L_n$ can be generalized to all frequency layers. In case of fully overlapped layers, $L_m$ and $L_n$ can be equal to one. The definition of $L_m$ and $L_n$ is given as:

$$L_m = SMTC_{target}/\max(SMTC_m, SMTC_{target})$$

Consequently, the cell identification delay for the target layer i is defined as:

$$T_{Identify\_Inter\_perUEgap,i} = K_{Inter-freq,GS} * \left(T_{full_{overlap}} + T_{partial_{overlap}} + \max(SMTCi, MGRP) * M_{Identify_{Inter-freq}}\right) =$$

$$K_{Inter-freq,GS} * \left( \sum_{m=1}^{N_{FR1}} L_m \times M_{Identify_{Inter-freq,FR1}} \text{Max}(SMTC_m, MGRP) + \right.$$
$$\left. \sum_{n=1}^{N_{FR2}} L_n \times M_{Identify_{Inter-freq,FR2}} \text{Max}(SMTC_n, MGRP) \right)$$

wherein $N_{FR1}$ is the number of fully overlapped and partially overlapped inter-frequency NR FR1 carriers with target layer 1; and $N_{FR2}$ is the number of fully overlapped and partially overlapped inter-frequency NR FR2 carriers with target layer i. Note that the target layer i is considered as one of fully overlapped layers.

The corresponding measurement delay can be defined as:

$$T_{Identify\_Inter\_perUEgap,i} = K_{Inter-freq,GS} *$$
$$\left( \sum_{m=1}^{N_{FR1}} L_m \times M_{measurement\_inter\_freq \cdot FR1} \text{Max}(SMTC_m, MGRP) + \right.$$
$$\left. \sum_{n=1}^{N_{FR2}} L_n \times M_{measurement\_inter\_freq \cdot FR2} \text{Max}(SMTC_n, MGRP) \right)$$

wherein $M_{measurement\_Inter-freq, FR1}$ is the number of SSB which is used to measure a cell on a FR1 inter-frequency carrier, which is FFS; and $M_{measurement\_Inter-freq, FR2}$ is the number of SSB which is used to measure a cell on a FR2 inter-frequency carrier, which is FFS.

For per frequency group gap based requirements if per band group gap is supported by the user equipment (UE), then the FR1 cell identification and FR2 cell identification can be conducted in parallel and the time delay for the cell identification or measurement will not be accumulated between FR1 and FR2.

Depending on the implementation, however, FR1 and FR2 layers can share the baseband searching. For example, there are two serving CC in FR1, named as CC1 and CC1, and one serving CC in FR2, named as CC3, assuming that there are two intra-frequency layers, f1 and f2, to be monitored without gap on CC1 and CC2, respectively. Meanwhile, f3 is a FR2 inter-frequency layer to be monitored with gap at CC3. In case, the SMTC of f1, f2 and f3 are colliding in time domain. Three searchers are needed for parallel measurement. If the UE have less than 3 searchers, the corresponding measurement delay will be increased. Since all measurements in FR2 are gap/interruption based, there is no parallel measurement at FR2 and therefore no further delay for FR1 layer is expected due to the limitation of searcher.

In a third embodiment, per-FR cell identification and measurement delay for FR2 should include the delay due to the limitation of number of searchers. The corresponding cell identification delay for FR1 and FR2 may be expressed as:

$$T_{Identify\_Inter\_perFR,FR1,i} = K_{Inter-freq,GS} *$$
$$\left( \sum_{m=1}^{N_{FR1}} L_m \times M_{Identification\_inter\_perFR \cdot FR1} \text{Max}(SMTC_m, MGRP) \right)$$

$$T_{Identify\_Inter\_perFR,FR2,i} = K_{Inter-freq,GS} * \text{max}(1, \text{abs}(N_{colliding}/2)) *$$
$$\left( \sum_{m=1}^{N_{FR2}} L_m \times M_{Identification\_inter\_perFR \cdot FR2} \text{Max}(SMTC_m, MGRP) \right)$$

wherein $K_{inter-freq,GS} = (1/X)*100$ where X is a signalled RRC parameter for gap sharing scheme, and the corresponding gap sharing table is FFS; $N_{freq, FR1}$ and $N_{freq, FR2}$ are the number of fully and partially overlapping inter-frequency NR FR1 and FR2 layers, respectively, with the target layer; and $N_{colliding}$ is the number of intra-frequency layers to be monitored without gap, which have colliding SMTC with the target layer.

The corresponding cell measurement delay may be defined as:

$$T_{measurement\_Inter\_perFR,FR1,i} = K_{Inter-freq,GS} *$$
$$\left( \sum_{m=1}^{N_{FR1}} L_m \times M_{measurement\_inter\_perFR \cdot FR1} \text{Max}(SMTC_m, MGRP) \right)$$

$$T_{measurement\_Inter\_perFR,FR2,i} = K_{Inter-freq,GS} * \text{max}(1, \text{abs}(N_{colliding}/2)) *$$
$$\left( \sum_{m=1}^{N_{FR2}} L_m \times M_{measurement\_inter\_perFR \cdot FR2} \text{Max}(SMTC_m, MGRP) \right)$$

One of the challenges to define gap based requirements is the availability of each individual gap is different even for the target carrier. Based on this observation, there have been some ideas to consider the competing carriers for each gap. The more carriers have SMTC occasions colliding on the same gap, the less opportunity that gap can be used to measure the target carrier. We acknowledge this is the right direction to resolve this issue. However, the existing proposals do not consider SMTC period differences among those carriers. SMTC periodicity can largely determine how quickly the corresponding carrier identification/measurement can be completed. Obviously, when the competing carrier is with smaller SMTC periodicity, that means the gap can be released quicker and becomes available for the target carrier earlier than when competing carrier's SMTC periodicity is larger. As a result, SMTC period of competing carrier should be considered.

To define the minimum performance requirements, we should always assume the target carrier is measured with the lowest priority. That means if there is any competing carrier on a gap, the gap should be used to complete the competing carrier first. It seems this principle is not fully reflected in the existing proposal.

Embodiments described herein can provide for accurate estimation of the maximum identification/measurement delay; accommodation of different SMTC periods from all MOs; or a combination of different measurement orders among all MOs.

Section 5

5.1 Proposal for Per UE Gap Based Requirements

In the updated proposal, the equivalent SMTC period of the i-th MO is defined as $\overline{SMTC}_i = \text{max}(SMTC_i, MGRP), i \in [1 \ldots ,N]$, where $N = N_{FR1} + N_{FR2}$ The gap utilization repetition period (GURP) is defined as $GURP = \text{max}(\overline{SMTC}_1 \ldots \overline{SMTC}_N)$ Within GURP, there are K gaps where K=GURP/MGRP.

The delay for carrier i due to competing carriers on the k-th gap, k∈{1, . . . , K}, is defined as $$T_{k,i} = \sum_{m=1,}^{N_{FR1}} L_{m,k} \times M_{Identify_{Inter-freq,FR1}} \overline{SMTC}_m +$$

$$\sum_{n=1}^{N_{FR2}} L_{n,k} \times M_{Identify_{Inter-freq,FR2}} \overline{SMTC}_n - M_{Identify_{Inter-freq,FR1}} \overline{SMTC}_i$$

where, $L_{m,k}$ is 1 if the m-th carrier can be monitored on the k-th gap. Otherwise, $L_{m,k}$ is 0.

$N_{FR1}$ is the number of fully overlapped and partially overlapped inter-frequency NR FR1 carriers with target layer i.

$N_{FR2}$ is the number of fully overlapped and partially overlapped inter-frequency NR FR2 carriers with target layer i.

$M_{measurement\_Inter-freq, FR}1$ is the number of SSB which is used to measure a cell on a FR1 inter-frequency carrier, which is FFS $M_{measurement\_Inter-freq, FR}2$ is the number of SSB which is used to measure a cell on a FR2 inter-frequency carrier, which is FFS Derive the identification delay based on the following formula $$\tilde{T}_{Identify\_Inter\_perUEgap,i} =$$

$$K_{Inter-freq,GS} * \frac{1}{K} \sum_{k=1}^{K} \left( \sum_{m=1}^{N_{FR1}} L_{m,k} \times M_{Identify_{Inter-freq,FR1}} \overline{SMTC}_m + \right.$$

$$\left. \sum_{n=1}^{N_{FR2}} L_{n,k} \times M_{Identify_{Inter-freq,FR2}} \overline{SMTC}_n \right)$$

If $\tilde{T}_{Indentify\_Inter\_perUEgap,i} \geq T_{k,i}$, k∈{1, K}, the identification requirement is defined as $$T_{Indentify\_Inter\_perUEgap,i} = \text{ceil}(\tilde{T}_{Indentify\_Inter\_perUEgap,i})$$

If $\tilde{T}_{Indentify\_Inter\_perUEgap,i} < T_{k,i}$ for some gaps, those gaps will be considered as unavailable for the target carrier measurement. The corresponding identification requirement is defined as $$T_{Identify\_Inter\_perUEgap,i} = K_{Inter-freq,GS} * \text{ceiling}$$

$$\left\{ * \frac{1}{K} \sum_{k1=1}^{K1} \left( \sum_{m=1}^{N_{FR1}} L_{m,k1} \times M_{Identify_{Inter-freq,FR1}} \overline{SMTC}_m + \right. \right.$$

$$\left. \left. \sum_{n=1}^{N_{FR2}} L_{n,k1} \times M_{Identify_{Inter-freq,FR2}} \overline{SMTC}_n \right) \right\}$$

where k1∈{1, . . . , K1} denotes the index of gap, of which $\tilde{T}_{Indentify\_Inter\_perUEgap,i} \geq T_{k1,i}$ Similar principle can apply to the gap based cell measurement requirements.

5.2 Per Frequency Group Gap Based Requirements

If per band group gap is supported by UE, then the FR1 cell identification and FR2 cell identification can be conducted in parallel and the time delay for the cell identification or measurement will not be accumulated between FR1 and FR2. Depending on the implementation, however, FR1 and FR2 layers can share the baseband searching. For example, there are two serving CC in FR1, named as CC1 and CC2, and one serving CC in FR2, named as CC3. Let's assume there are two intra-frequency layers, f1 and f2, to be monitored without gap on CC1 and CC2, respectively. Meanwhile, f3 is a FR2 inter-frequency layer to be monitored with gap at CC3. In case, the SMTC of f1,f2 and f3 are colliding in time domain. Three searchers are needed for parallel measurement. If UE have less than 3 searchers, the corresponding measurement delay will be increased. Since all measurements in FR2 are gap/interruption based, there is no parallel measurement at FR2 and therefore no further delay for FR1 layer is expected due to the limitation of searcher.

The corresponding cell identification delay for FR1 and FR2 is proposed as

In the updated proposal, the equivalent SMTC period of the i-th MO is defined as $\overline{SMTC}_i = \max(SMTC_i, MGRP), i \in [1, \ldots, N]$, where $N = N_{FR1} + N_{FR2}$ The gap utilization repetition period (GURP) of FR1 and FR2 are defined as $GURP_{FR1} = \max(\overline{SMTC}_1 \ldots \overline{SMTC}_{N_{FR1}})$ $GURP_{FR2} = \max(\overline{SMTC}_1 \ldots \overline{SMTC}_{N_{FR2}})$ For FR1, there are $K_{FR1}$ gaps with GURP for FR1 where $K_{FR1} = GURP_{FR1}/MGRP_{FR1}$. For FR1 target carrier, the delay for carrier i due to competing carriers on the k-th gap, k∈{1, . . . , $K_{FR1}$}, is defined as $T_{k,i} = \sum_{m=1}^{N_{FR1}} L_{m,k} \times M_{Identify_{Inter-freq,FR1}} \overline{SMTC}_m - M_{Identify_{Inter-freq,FR1}} \overline{SMTC}_i$ Derive the identification delay based on the following formula $$\tilde{T}_{Identify\_Inter\_perUEgap,i} =$$

$$K_{Inter-freq,GS} * \frac{1}{K} \sum_{k=1}^{K_{FR1}} \left( \sum_{m=1}^{N_{FR1}} L_{m,k} \times M_{Identify_{Inter-freq,FR1}} \overline{SMTC}_m \right)$$

If $\tilde{T}_{Indentify\_Inter\_perUEgap,i} \geq T_{k,i}$, k∈{1, K}, the identification requirement is defined as $$T_{Indentify\_Inter\_perUEgap,i} = \text{ceil}(\tilde{T}_{Indentify\_Inter\_perUEgap,i})$$

If $\tilde{T}_{Indentify\_Inter\_perUEgap,i} < T_{k,i}$ for some gaps, those gaps will be considered as unavailable for the target carrier measurement. The corresponding identification requirement is defined as $$T_{Identify\_Inter\_perUEgap,i} = K_{Inter-freq,GS} * \text{ceiling}$$

$$\left\{ * \frac{1}{K} \sum_{k1=1}^{K1_{FR1}} \left( \sum_{m=1}^{N_{FR1}} L_{m,k1} \times M_{Identify_{Inter-freq,FR1}} \overline{SMTC}_m \right) \right\}$$

where $k1 \in \{1, \ldots, K1_{FR1}\}$ denotes the index of gap, of which $$\tilde{T}_{Indentify\_Inter\_perUEgap,i} \geq T_{k1,i}$$

For FR2, there are $K_{FR1}$ gaps with GURP for FR2 where $K_{FR2}=\text{GURP}_{FR2}/\text{MGRP}_{FR2}$. For FR2 target carrier, the delay for carrier i due to competing carriers on the k-th gap, $k \in \{1 \ldots, K_{FR2}\}$, is defined as $$T_{k,i} = \sum_{m=1}^{N\_FR2} L_{m,k} \times M_{Identify_{Inter-freq,FR2}} \overline{SMTC}_m - M_{Identify_{Inter-freq,FR2}} \overline{SMTC}_i$$

Derive the identification delay based on the following formula $$\tilde{T}_{Identify\_Inter\_perUEgap,i} = K_{Inter-freq,GS} * \frac{1}{K} \sum_{k=1}^{K1_{FR2}} \left( \sum_{m=1}^{N_{FR2}} L_{m,k} \times M_{Identify_{Inter-freq,FR2}} \overline{SMTC}_m \right)$$

If $\tilde{T}_{Indentify\_Inter\_perUEgap,i} \geq T_{k,i}$, $k \in \{1, K_{FR2}\}$, the identification requirement is defined as $$T_{Identify\_Inter\_perUEgap,i} =$$
$$\max\left(1, \text{celling}\left(\frac{N_{colliding}+1}{2}\right)\right) * \text{ceil}(\tilde{T}_{Identify\_Inter\_perUEgap,i})$$

where $N_{colliding}$ is the number of intra-frequency layers to be monitored without gap, which have colliding SMTC with the target layer.

If $\tilde{T}_{Indentify\_Inter\_perUEgap,i} < T_{k,i}$ for some gaps, those gaps will be considered as unavailable for the target carrier measurement. The corresponding identification requirement is defined as $$T_{Identify\_Inter\_perUEgap,i} = K_{Inter-freq,GS} * \max\left(1, \text{ceiling}\left(\frac{N_{colliding}+1}{2}\right)\right) *$$
$$\text{ceiling}\left\{ * \frac{1}{K_{FR2}} \left( \sum_{k1=1}^{K1_{FR2}} L_{m,k1} \times M_{Identify_{Inter-freq,FR2}} \overline{SMTC}_m \right) \right\}$$

where $k1 \in \{1, \ldots, K1_{FR2}\}$ denotes the index of gap, of which $$\tilde{T}_{Indentify\_Inter\_perUEgap,i} \geq T_{k1,i}$$

Similar principles can apply to the gap based cell measurement requirements.

Figure 2:
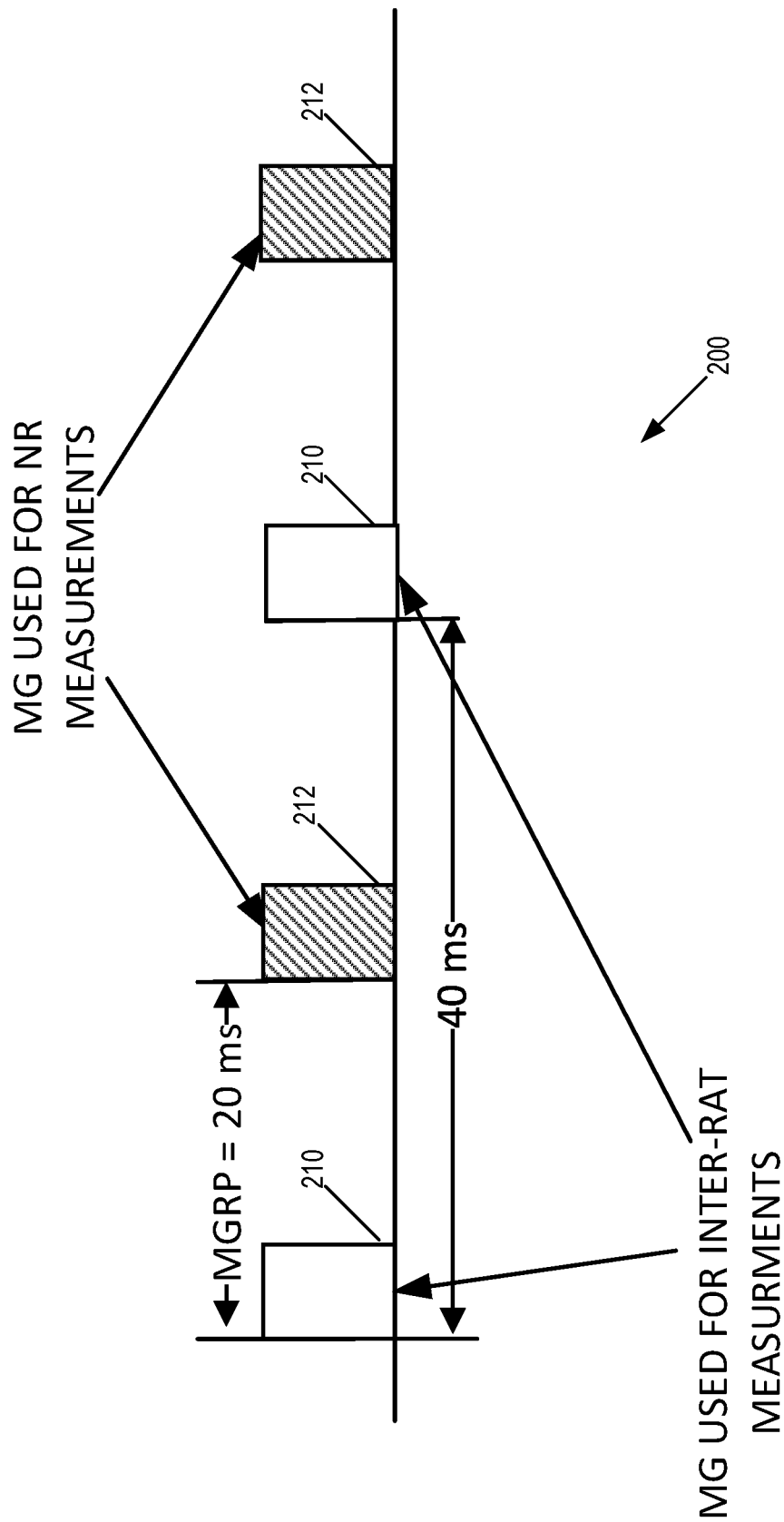
FIG. 2 is a diagram of an example to configure short MGRP for inter-RAT and NR measurement in accordance with one or more embodiments.

Referring now to FIG. 2, a diagram of an example to configure short MGRP for inter-RAT and NR measurement in accordance with one or more embodiments will be discussed. In the diagram 200, time is shown on the horizontal axis, measurement gap (MG) used for inter-RAAT measurements are represented by the solid blocks 210, and MG used for New Radio (NR) measurements are represented by the hatched blocks 212. There are three aspects not addressed in the Release-15 NR specification for measurement gap.

For a first aspect, gap usage control for Intra-frequency measurement during BWP switching. Since when network configures MG to UE for intra-frequency measurement object (MO), it has no idea if BWP switching will happen during the intra-frequency measurement; if BWP (bandwidth part) switching happens, then the measurement case may change from intra-frequency measurement without MG to intra-frequency measurement with MG. In this sense, some occasions of the intra-frequency measurements may not need MG, and it would be better to let network activate or deactivate MG.

For a second aspect, more gap patterns could be used for LTE/2G/3G measurement. For example, table 9.1.2-2 shows various MG configuration patterns. That is to say, only limited gap patterns can be used for inter-RAT measurement from NR, which might need to be improved.

TABLE 9.1.2-2

Applicability for Gap Pattern Configurations supported by the E-UTRA-NR dual connectivity UE

| Measurement gap pattern configuration | Serving cell | Measurement Purpose | Applicable Gap Pattern Id |
|---|---|---|---|
| Per-UE measurement gap | E-UTRA + FR1, or | non-NR RAT [Note1,2] FR1 and/or FR2 | 0, 1, 2, 3 0-11 |
| | E-UTRA + FR2, or E-UTRA + FR1 + FR2 | non-NR RAT [Note1,2] and FR1 and/or FR2 | 0, 1, 2, 3 |
| Per FR measurement gap | E-UTRA and, FR1 if configured FR2 if configured | non-NR RAT [Note1,2] | 0, 1, 2, 3 No gap |
| | E-UTRA and, FR1 if configured FR2 if configured | FR1 only | 0-11 No gap |
| | E-UTRA and, FR1 if configured FR2 if configured | FR2 only | No gap 12-23 |
| | E-UTRA and, FR1 if configured FR2 if configured | non-NR RAT [Note1,2] and FR1 | 0, 1, 2, 3 No gap |
| | E-UTRA and, FR1 if configured FR2 if configured | FR1 and FR2 | 0-11 12-23 |
| | E-UTRA and, FR1 if configured FR2 if configured | non-NR RAT [Note1,2] and FR2 | 0, 1, 2, 3 12-23 |
| | E-UTRA and, FR1 if configured FR2 if configured | non-NR RAT [Note1,2] and FR1 and FR2 | 0, 1, 2, 3 12-23 |

Note:
if GSM or UTRA TDD or UTRA FDD inter-RAT frequency layer is configured to be monitored, only measurement gap pattern #0 and #1 can be used for per-FR gap in E-UTRA and FR1 if configured, or for per-UE gap.
NOTE1:
Non-NR RAT includes E-UTRA, UTRA and/or GSM.
NOTE2:
The gap pattern 2 and 3 are supported by UEs which support shortMeasurementGap-r14.
NOTE 3:
When E-UTRA inter-frequency RSTD measurements are configured and the UE requires measurement gaps for performing such measurements, only Gap Pattern #0 can be used.

A third aspect is to extend the gap sharing table. Table 9.1.2-5 is a gap sharing table that shows the gap sharing between intra-frequency and inter-frequency measurements. In order to prioritize the inter-RAT measurement, this table may be extended to gap sharing among intra-frequency, inter-frequency, and inter-RAT.

TABLE 9.1.2-5

| Value of parameter X | |
|---|---|
| Network signaling ParameterName (to be determined by RAN2) | Value of X (%) |
| '00' | Equal splitting |
| '01' | [25] |
| '10' | [50] |
| '11' | [75] |

In a first embodiment, a network element configures a deactivated measurement gap (MG) pattern for UE measurement, and the network element uses an indication to activate or deactivate one or more MG occasions. A deactivated MG pattern is an MG pattern to be maintained at a UE but is not to be applied by the UE unless the MG occasions in this pattern is/are activated by the network. An activated MG occasion is an MG occasion to be applied by the UE to the current serving cells of this UE. During an activated MG occasion duration, the UE is not be expected to receive or transmit any signal to its serving cell. The deactivated MG occasion is an MG occasion which is not to be applied by the UE to the current serving cells of the UE. During the deactivated MG occasion duration, the UE keeps receiving or transmitting signals to its serving cell, if scheduled. In this embodiment, the indication to activate or deactivate one or more MG occasions may be carrier by physical (PHY) layer, e.g., downlink control information (DCI), media access control (MAC), or radio resource control (RRC) signaling. When the PHY carries the indication, the indication may be associated or included in the DCI of a bandwidth part (BWP) switching command. An activation/deactivation command can apply for single MG occasion or multiple MG occasions.

Considering for example New Radio (NR) intra-frequency measurement, if the network (NW) configures the UE with an intra-frequency MO which does not need MG and also configures the UE with a deactivated MG pattern, the UE performs the intra-frequency measurement without MG, and the deactivated MG will not interrupt any data/signal from/to a current serving cells. During the intra-frequency measurement period, if the NW wants to switch the BWP for this UE, and the current intra-frequency measurement object (MO) needs an MG after BWP switching, then the NW sends a BWP switching command to the UE. The BWP switching command is included in DCI together with the MG activation command to activate the MG for the UE to continue the intra-frequency measurements. After a certain period, if the NW wants to switch a BWP back to the previous BWP, then the NW sends another BWP switching command to the UE in DCI together with the MG deactivation command to deactivate the MG for the UE.

In a second embodiment, the network element configures an activated MG pattern for UE measurement, and the network element uses an indication to deactivate one or more MG occasions or activate one or more MG occasions. In this embodiment, the one or more activated or deactivated MG occasions may have MG patterns as defined by the activated MG pattern configuration. The activated MG pattern is an MG pattern, which is applied by the UE to its serving cells unless the MG occasions in this pattern is/are deactivated by the network element. The activated MG occasion is the MG occasion to be applied by the UE to the current serving cells of the UE. During the activated MG occasion duration, the UE is not expected to receive or transmit any signal to its serving cell. The deactivated MG occasion is an MG occasion that is not to be applied by the UE to the current serving cells of the UE. During the deactivated MG occasion duration, the UE keeps receiving or transmitting signals to its serving cell if scheduled. In this embodiment, the indication may be carried by PHY (e.g., DCI), MAC, or RRC signaling. An activation/deactivation command can apply for a single MG occasion or for multiple MG occasions.

In a third embodiment, an NR UE is configured as shown in FIG. 2 with an MGRP of 20 milliseconds (ms) with an MG length (MGL) of 6 ms or 3 ms for one or more inter-RAT measurements. The inter-RAT measurements may use the MG occasion each 40 ms or 80 ms, and the other occasions could be used for NR measurements. In this embodiments, the term "inter-RAT" means a RAT different from NR, e.g., Long Term Evolution (LTE), Universal Mobile Telecommunications Service (UMTS), Code Division Multiple Access 2000 (CDMA2000), Global System for Mobile communications (GSM), or the like. As shown in FIG. 2, the network (NW) configured a 20 ms MGRP for inter-RAT MO and NR MO, and the UE can use the 40 ms interval to conduct the inter-RAT measurements, and the other MGs can be used to conduct NR measurement.

In a fourth embodiment, gap sharing is applied for intra-frequency MO, inter-frequency MO and inter-RAT MO individually, and the gap sharing table is designed to differentiate the gap sharing percentages explicitly among intra-frequency MO, inter-frequency MO and inter-RAT MO.

Measurement gap sharing applies when UE requires measurement gaps to identify and measure intra-frequency cells or when SMTC configured for intra-frequency measurement are fully overlapping with measurement gaps, and when UE is configured to identify and measure cells on inter-frequency carriers and inter-RAT carriers. When network signals "00", "01", "10" or "11" for X and Y respectively, where X and Y is a signaled RRC parameters and is defined as in Table 1. X is the percentage of time used for intra-frequency MO and Y is the percentage of time used for inter-frequency MO.

The performance of intra-frequency measurements with no measurement gaps, when SMTC configured for intra-frequency measurement are fully overlapping with measurement gaps, shall consider the factor Kintra=1/X*100. The performance of intra-frequency measurements with measurement gaps shall consider the factor Kintra=1/X*100. The performance of inter-frequency measurement shall consider the factor Kinter-frequency=1/Y*100. The performance of inter-RAT measurement shall consider the factor Kinter-RAT=1/(100−X−Y)*100. When network signals "00" indicating equal splitting gap sharing, X and Y is not applied. X+Y<100%.

TABLE 1

| Value of parameter X, Y | | |
|---|---|---|
| Network signaling ParameterName (to be determined by RAN2) | Value of X (%) | Value of Y (%) |
| '00' | Equal splitting | Equal splitting |
| '01' | X1 | Y1 |
| '10' | X2 | Y2 |
| '11' | X3 | Y3 |

In one or more embodiments, the measurement procedures as discussed herein can be performed by a Fifth Generation (5G) NodeB (gNB) and/or a user equipment according to Third Generation Partnership Project (3GPP) Technical Specification (TS) 38.133 V15.5.0 (2019-03) which is incorporated herein by reference in its entirety. For example, Section 9 describes the Measurement Procedure and Section 9.1.2 describes Measurement Gap operations including Table 9.1.2-2 as described herein. In addition, Section 9.1.5 describes a Carrier-specific scaling factor (CSSF) as discussed herein. Additional subject matter is included in Section 9 as follows.

9.1.5.2 Monitoring of Multiple Layers within Gaps

The carrier-specific scaling factor $CSSF_{within\_gap,i}$ for measurement object i derived in this chapter is applied to following measurement types:

Intra-frequency measurement with no measurement gap in Section 9.2.5, when all of the SMTC occasions of this intra-frequency measurement object are overlapped by the measurement gap.

Intra-frequency measurement with measurement gap in Section 9.2.6.

Inter-frequency measurement in Section 9.3

Inter-RAT measurement in Section 9.4

UE is expected to conduct the measurement of this measurement object i only within the measurement gaps.

If the higher layer signaling in TS 38.331 [2] signaling of smtc2 is present and smtc1 is fully overlapping with measurement gaps and smtc2 is partially overlapping with measurement gaps, $CSSF_{within\_gap\_i}$ and requirements derived from $CSSF_{outside\_gap\_i}$ are not specified.

9.1.5.2.1 NSA Mode: Carrier-Specific Scaling Factor for SSB-Based Measurements Performed within Gaps Editor's note: The scaling value $CSSF_{within\_gap,i}$ below has been derived without considering GSM inter-RAT carriers. When one or more measurement objects are monitored within measurement gaps, the carrier specific scaling factor for a target measurement object with index i is designated as $CSSF_{within\_gap,i}$ and is derived as described in this section.

If measurement object i refers to an RSTD measurement with periodicity Tprs>160 ms or with periodicity Tprs=160 ms but prs-MutingInfo-r9 is configured, $CSSF_{within\_gap,i}=1$. Otherwise, the $CSSF_{within\_gap,i}$ for other measurement objects (including RSTD measurement with periodicity Tprs=160 ms) participate in the gap competition are derived as below.

For each measurement gap j not used for an RSTD measurement with periodicity Tprs>160 ms or with periodicity Tprs=160 ms but prs-MutingInfo-r9 is configured within an arbitrary 160 ms period, count the total number of intrafrequency measurement objects and interfrequency/interRAT measurement objects which are candidates to be measured within the gap j.

An NR carrier is a candidate to be measured in a gap if its SMTC duration is fully covered by the MGL excluding RF switching time. For intrafrequency NR carriers, if the high layer in TS 38.331 [2] signaling of smtc2 is configured, the assumed periodicity of SMTC occasions corresponds to the value of higher layer parameter smtc2; Otherwise the assumed periodicity of SMTC occasions corresponds to the value of higher layer parameter smtc1.

An interRAT measurement object is a candidate to be measured in all measurement gaps.

$R_i$ is the maximal ratio of the number of measurement gap where measurement object i is a candidate to be measured over the number of measurement gap where measurement object i is a candidate and not used for RSTD measurement with periodicity Tprs>160 ms or with periodicity Tprs=160 ms but prs-MutingInfo-r9 is configured within an arbitrary 1280 ms period.

For UEs which support and are configured with per FR gaps, the counting is done on a per FR basis, and for UEs which are configured with per UE gaps the counting is done on a per UE basis.

Per gap j:

$M_{intra,i,j}$: Number of intrafrequency measurement objects which are candidates to be measured in gap j where the measurement object i is also a candidate. Otherwise $M_{intra,i,j}$ equals 0.

$M_{inter,i,j}$: Number of NR interfrequency measurement objects or NR interRAT measurement objects configured by E-UTRA PCell, EUTRA interfrequency measurement objects configured by E-UTRA PCell, UTRA inter-RAT measurement objects and GSM interRAT measurement objects configured by E-UTRA PCell which are candidates to be measured in gap j where the measurement object i is also a candidate. Otherwise $M_{inter,i,j}$ equals 0.

$M_{tot,i,j}=M_{intra,i,j}+M_{inter,i,j}$: Total number of intrafrequency, interfrequency and interRAT measurement objects which are candidates to be measured in gap j where the measurement object i is also a candidate. Otherwise $M_{tot,i,j}$ equals 0.

The carrier specific scaling factor $CSSF_{within\_gap,i}$ is given by:

If measGapSharingScheme is equal sharing, $CSSF_{within\_gap,i}=\max(\text{ceil}(R_i \times M_{tot,i,j}))$, where j=0 . . . (160/MGRP)−1

If measGapSharingScheme is not equal sharing and measurement object i is an intrafrequency measurement object, $CSSF_{within\_gap,i}$ is the maximum among ceil($R_i \times K_{intra} \times M_{intra,i,j}$) in gaps where $M_{inter,i,j} \neq 0$, where j=0 . . . (160/MGRP)−1 ceil($R_i \times M_{intra,i,j}$) in gaps where $M_{inter,i,j}=0$, where j=0 . . . (160/MGRP)−1 measurement object i is an interfrequency or interRAT measurement object, $CSSF_{within\_gap,i}$ is the maximum among ceil($R_i \times K_{inter} \times M_{inter,i,j}$) in gaps where $M_{intra,i,j} \neq 0$, where j=0 . . . (160/MGRP)−1 ceil($R_i \times M_{inter,i,j}$) in gaps where $M_{intra,i,j}=0$, where j=0 . . . (160/MGRP)−1

9.1.5.2.2 SA Mode: Carrier-Specific Scaling Factor for SSB-Based Measurements Performed within Gaps When one or more measurement objects are monitored within measurement gaps, the carrier specific scaling factor for a target measurement object with index i is designated as $CSSF_{within\_gap,i}$ and is derived as described in this section.

If measurement object i refers to an RSTD measurement with periodicity Tprs>160 ms or with periodicity Tprs=160 ms but prs-MutingInfo-r9 is configured, $CSSF_{within\_gap,i}=1$. Otherwise, the $CSSF_{within\_gap,i}$ for other measurement objects (including RSTD measurement with periodicity Tprs=160 ms) participate in the gap competition and the $CSSF_{within\_gap,i}$ are derived as below.

For each measurement gap j not used for an RSTD measurement with periodicity Tprs>160 ms or with periodicity Tprs=160 ms but prs-MutingInfo-r9 is configured within an arbitrary 160 ms period, count the total number of intrafrequency measurement objects and interfrequency/interRAT measurement objects which are candidates to be measured within the gap j.

An NR carrier is a candidate to be measured in a gap if its SMTC duration is fully covered by the MGL excluding RF switching time. For intrafrequency NR carriers, if the high layer in TS 38.331 [2] signaling of smtc2 is configured, the assumed periodicity of SMTC occasions corresponds to the value of higher layer parameter smtc2; Otherwise the assumed periodicity of SMTC occasions corresponds to the value of higher layer parameter smtc1.

An interRAT measurement object is a candidate to be measured in all measurement gaps.

$R_i$ is the maximal ratio of the number of measurement gap where measurement object i is a candidate to be measured over the number of measurement gap where measurement object i is a candidate and not used for RSTD measurement with periodicity Tprs>160 ms or with periodicity Tprs=160 ms but prs-MutingInfo-r9 is configured within an arbitrary 1280 ms period.

For UEs which support and are configured with per FR gaps, the counting is done on a per FR basis, and for UEs which are configured with per UE gaps the counting is done on a per UE basis.

Per gap j:

$M_{intra,i,j}$: Number of intrafrequency measurement objects which are candidates to be measured in gap j where the measurement object i is also a candidate. Otherwise $M_{intra,i,j}$ equals 0.

$M_{inter,i,j}$: Number of NR interfrequency and EUTRA interRAT measurement objects which are candidates to be measured in gap j where the measurement object i is also a candidate. Otherwise $M_{inter,i,j}$ equals 0.

$M_{tot,i,j} = M_{intra,i,j} + M_{inter,i,j}$: Total number of intrafrequency, interfrequency and interRAT measurement objects which are candidates to be measured in gap j where the measurement object i is also a candidate. Otherwise $M_{tot,i,j}$ equals 0.

The carrier specific scaling factor $CSSF_{within\_gap,i}$ is given by:

If measGapSharingScheme is equal sharing, $CSSF_{within\_gap,i} = \max(\text{ceil}(R_i \times M_{tot,i,j}))$, where j=0 ... (160/MGRP)−1

If measGapSharingScheme is not equal sharing and
  measurement object i is an intrafrequency measurement object, $CSSF_{within\_gap,i}$ is the maximum among
    $\text{ceil}(R_i \times K_{intra} \times M_{intra,i,j})$ in gaps where $M_{inter,i,j} \neq 0$, where j=0 ... (160/MGRP)−1
    $\text{ceil}(R_i \times M_{intra,i,j})$ in gaps where $M_{inter,i,j} = 0$, where j=0 ... (160/MGRP)−1
  measurement object i is an interfrequency or interRAT measurement object, $CSSF_{within\_gap,i}$ is the maximum among
    $\text{ceil}(R_i \times K_{inter} \times M_{inter,i,j})$ in gaps where $M_{intra,i,j} \neq 0$, where j=0 ... (160/MGRP)−1
    $\text{ceil}(R_i \times M_{inter,i,j})$ in gaps where $M_{intra,i,j} = 0$, where j=0 ... (160/MGRP)−1

Figure 3:
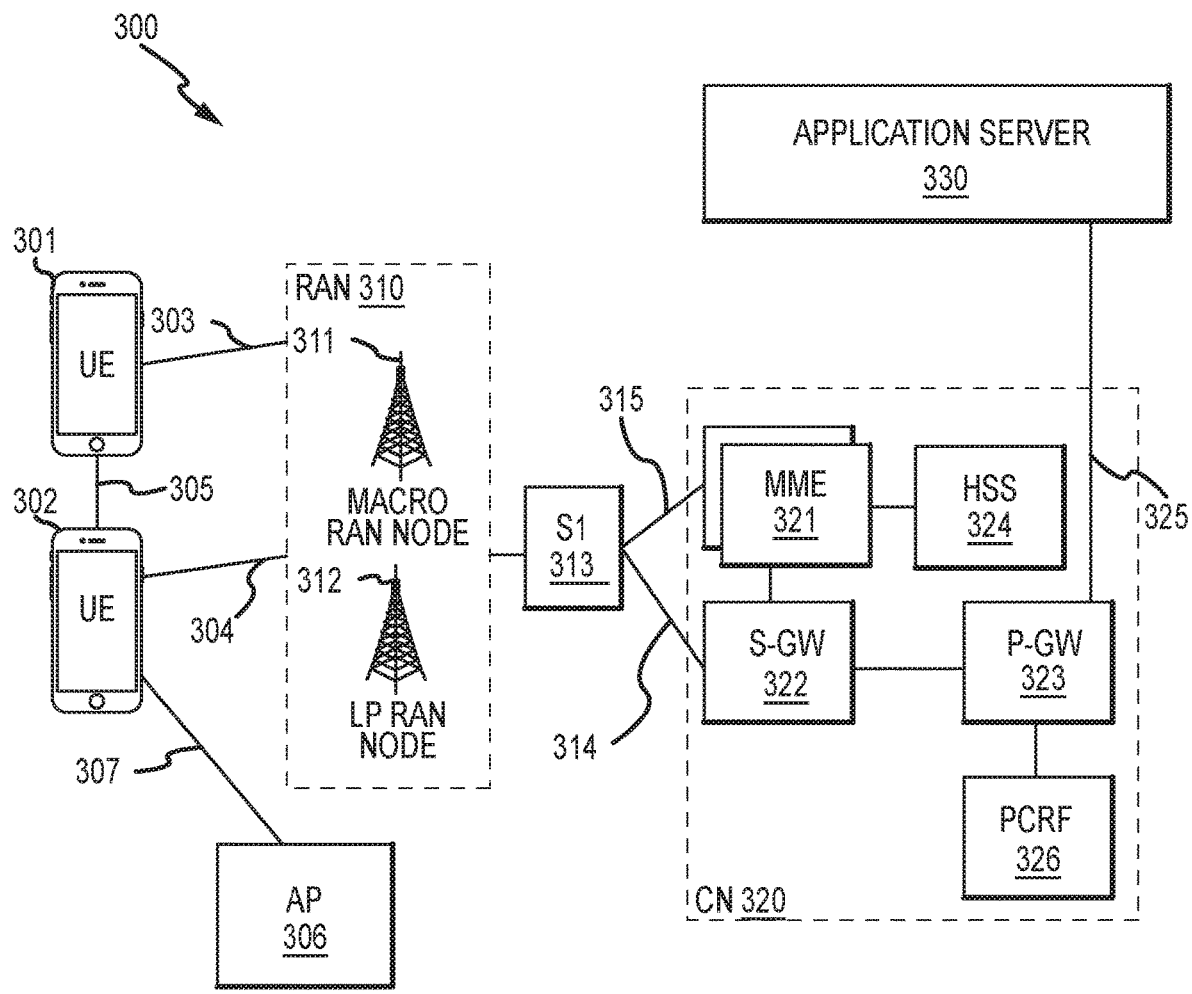
FIG. 3 illustrates an architecture of a system 300 of a network in accordance with some embodiments.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells, e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
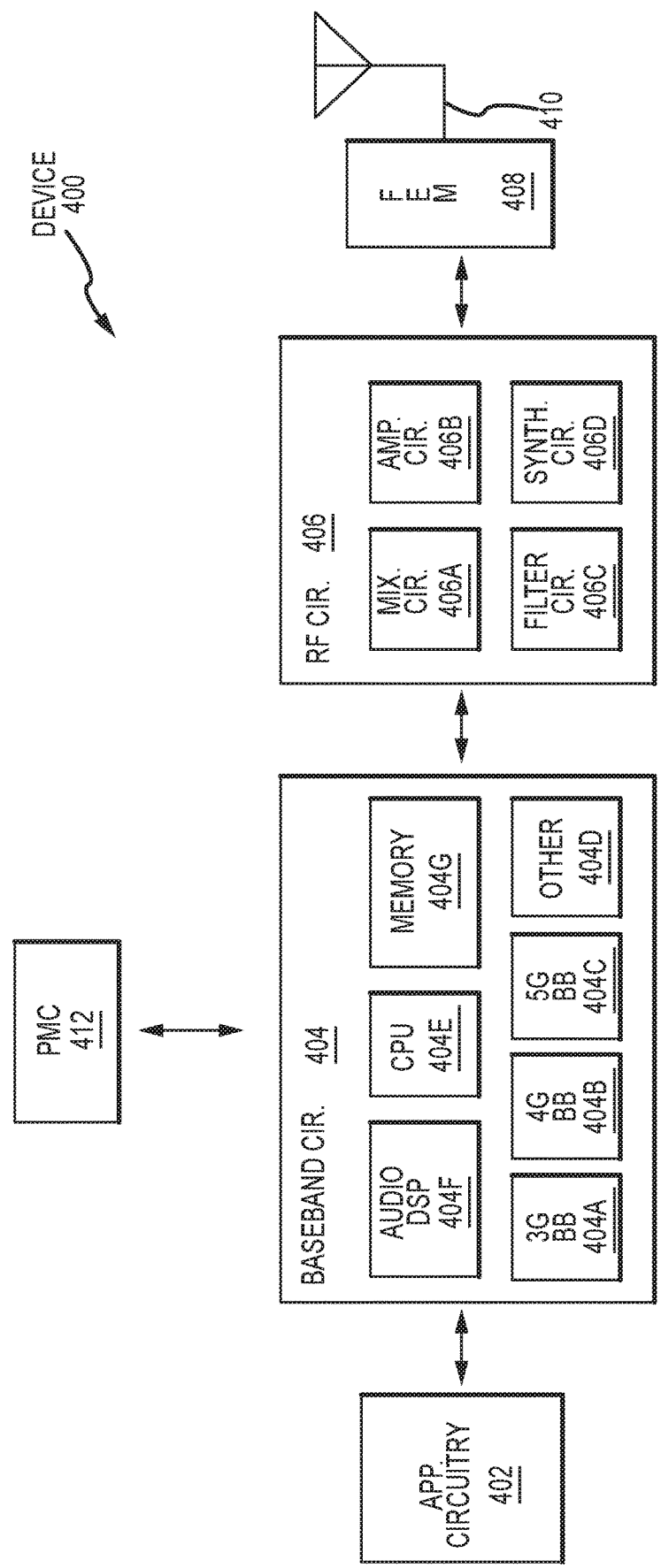
FIG. 4 illustrates example components of a device in accordance with some embodiments.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect. In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. However, in other embodiments, the PMC 412 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
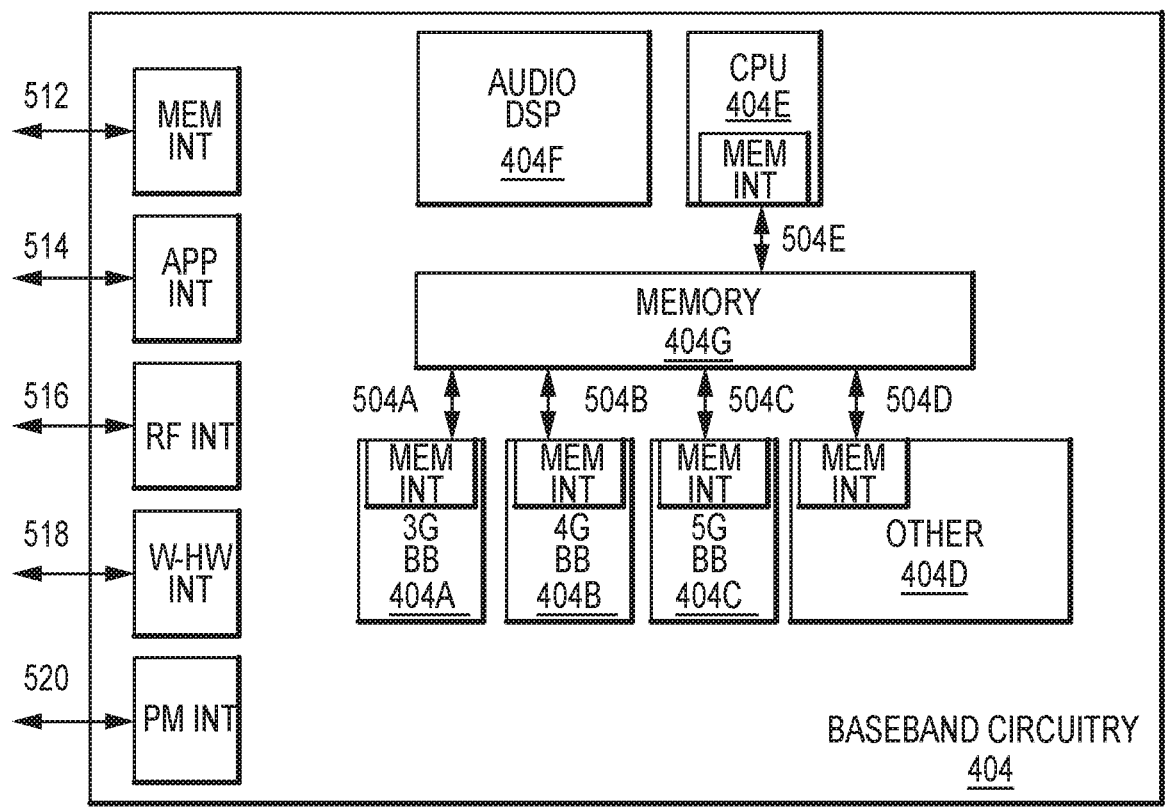
FIG. 5 illustrates example interfaces of baseband circuitry in accordance with some embodiments.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

Although the claimed subject matter has been described with a certain degree of particularity, it should be recognized that elements thereof may be altered by persons skilled in the art without departing from the spirit and/or scope of claimed subject matter. It is believed that the subject matter pertaining to a mechanism on measurement gap based inter-frequency measurement and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A user equipment (UE), comprising:
radio frequency (RF) circuitry configured to communicate with a network; and
a processor communicatively coupled to the RF circuitry and configured to perform operations, comprising:
receiving a message from a base station indicating that the UE is to perform one or more measurements in one or more target frequency layers, and for each of the one or more target frequency layers, to divide one or more other frequency layers into one of three categories comprising fully overlapped frequency layers, partially overlapped frequency layers, and non-overlapped frequency layers, wherein the UE uses a first scaling factor for measurements of frequency range 1 (FR1) carriers and a second scaling factor for per-frequency range (FR) based measurements for frequency range 2 (FR2) carriers.

2. The UE of claim 1, the operations further comprising: determining a measurement delay and/or cell identification delay based on fully overlapped frequency layers and partially overlapped frequency layers.

3. The UE of claim 2, wherein a corresponding delay for a fully overlapped frequency layer is defined as:

$$T_{full\_overlap} = \sum_{m=1}^{N_{full,FR}} M_{identify_{inter-freq,FR1}} \times \text{Max}(SMTC_m, MGRP) + \sum_{n=1}^{N_{full,FR}} M_{identify_{inter-freq,FR2}} \times \text{Max}(SMTC_n, MGRP).$$

4. The UE of claim 2, wherein a corresponding delay for partially overlapped frequency layer is defined as:

$$T_{partial\_overlap} = \sum_{m=1}^{N_{partial,FR1}} L_m \times M_{identify_{inter-freq,FR}} \times \text{Max}(SMTC_m, MGRP) +$$

-continued $$\sum_{n=1}^{N_{partial,FR2}} L_n \times M_{identify_{inter-fre,FR}} \times \text{Max}(SMTC_n, MGRP).$$

5. The UE of claim 2, wherein one of the first or second scaling factors L is to be used to scale the measurement delay and/or identification delay based on a different synchronization signal block (SSB) based measurement timing configuration (SMTC) ratio of a target frequency layer and the one or more other frequency layers.

6. The UE of claim 5, wherein the first scaling factor L is defined as $L_m = SMTC_{target}/\text{max}(SMTC_m, SMTC_{target})$ to unify fully overlapped frequency layers and partially overlapped frequency layers for both per-UE based measurements and per-frequency range (FR) based measurement.

7. The UE of claim 1, wherein the one or more measurements have a minimum cell identification delay and/or a minimum measurement delay, and wherein the operations further comprise:
calculating an availability of each individual measurement gap for a target measurement object (MO) based on a synchronization signal block (SSB) based measurement timing configuration (SMTC) periodicity and measurement gap (MG) repetition period MGRP of a competing MO.

8. The UE of claim 7, wherein the operations further comprise:
determining an overall measurement by an SMTC period and a measurement order of one or more competing MO's, wherein the measurement delay and/or cell identification delay are minimized; and
discarding a corresponding gap to never be used to monitor the target MO in response to a calculated delay being shorter than a time when a gap becomes available.

9. A processor of a user equipment (UE) configured to perform operations, comprising:
receiving a message from a base station indicating that the UE is to perform one or more measurements in one or more target frequency layers, and for each of the one or more target frequency layers, to divide one or more other frequency layers into one of three categories comprising fully overlapped frequency layers, partially overlapped frequency layers, and non-overlapped frequency layers, wherein the UE uses a first scaling factor for measurements of frequency range 1 (FR1) carriers and a second scaling factor for per-frequency range (FR) based measurements for frequency range 2 (FR2) carriers.

10. The processor of claim 9, the operations further comprising:
determining a measurement delay and/or cell identification delay based on fully overlapped frequency layers and partially overlapped frequency layers.

11. The processor of claim 10, wherein a corresponding delay for a fully overlapped frequency layer is defined as:

$$T_{full\_overlap} = \sum_{m=1}^{N_{full,FR}} M_{identify_{inter-freq,FR1}} \times \text{Max}(SMTC_m, MGRP) +$$

$$\sum_{n=1}^{N_{full,FR}} M_{identify_{inter-freq,FR}} \times \text{Max}(SMTC_n, MGRP).$$

12. The processor of claim 10, wherein a corresponding delay for partially overlapped frequency layer is defined as:

$$T_{partial\_overlap} = \sum_{m=1}^{N_{partial,FR}} L_m \times M_{identify_{inter-fr,FR1}} \times \text{Max}(SMTC_m, MGRP) +$$

$$\sum_{n=1}^{N_{partial,FR}} L_n \times M_{identify_{inter-freq,FR2}} \times \text{Max}(SMTC_n, MGRP).$$

13. The processor of claim 10, wherein one of the first or second scaling factors L is to be used to scale the measurement delay and/or identification delay based on a different synchronization signal block (SSB) based measurement timing configuration (SMTC) ratio of a target frequency layer and one or more other frequency layers.

14. The processor of claim 13, wherein the first scaling factor L is defined as $L_m = SMTC_{target}/\text{max}(SMTC_m, SMTC_{target})$ to unify fully overlapped frequency layers and partially overlapped frequency layers for both per-UE based measurements and per-frequency range (FR) based measurement.

15. One or more non-transitory computer-readable media comprising instructions to cause an electronic device, upon execution of the instructions by one or more processors of the electronic device, to perform operations, comprising:
receiving a message from a base station indicating that the UE is to perform one or more measurements in one or more target frequency layers, and for each of the one or more target frequency layers, to divide one or more other frequency layers into one of three categories comprising fully overlapped frequency layers, partially overlapped frequency layers, and non-overlapped frequency layers, wherein the UE uses a first scaling factor for measurements of frequency range 1 (FR1) carriers and a second scaling factor for per-frequency range (FR) based measurements for frequency range 2 (FR2) carriers.

16. The non-transitory computer-readable media of claim 15, the operations further comprising:
determining a measurement delay and/or cell identification delay based on fully overlapped frequency layers and partially overlapped frequency layers.

17. The non-transitory computer-readable media of claim 16, wherein a corresponding delay for a fully overlapped frequency layer is defined as:

$$T_{full\_overlap} = \sum_{m=1}^{N_{full,FR1}} M_{identify_{inter-fr,FR1}} \times \text{Max}(SMTC_m, MGRP) +$$

$$\sum_{n=1}^{N_{full,FR2}} M_{identify_{inter-freq,FR2}} \times \text{Max}(SMTC_n, MGRP).$$

18. The non-transitory computer-readable media of claim 16, wherein a corresponding delay for partially overlapped frequency layer is defined as:

$$T_{partial\_overlap} = \sum_{m=1}^{N_{partial,FR}} L_m \times M_{identify_{inter-fr,FR}} \times \text{Max}(SMTC_m, MGRP) +$$

-continued $$\sum_{n=1}^{N_{partial,FR2}} L_n \times M_{identify_{inter-freq,FR2}} \times \text{Max}(SMTC_n, MGRP).$$

19. The non-transitory computer-readable media of claim 16, wherein one of the first or second scaling factors L is to be used to scale the measurement delay and/or identification delay based on a different synchronization signal block (SSB) based measurement timing configuration (SMTC) ratio of a target frequency layer and one or more other frequency layers.

20. The non-transitory computer-readable media of claim 19, wherein the first scaling factor L is defined as $L_m = SMTC_{target}/\max(SMTC_m, SMTC_{target})$ to unify fully overlapped frequency layers and partially overlapped frequency layers for both per-UE based measurements and per-frequency range (FR) based measurement.

* * * * *